United States Patent
Schümann et al.

(10) Patent No.: US 7,033,668 B2
(45) Date of Patent: Apr. 25, 2006

(54) ELECTRICALLY CONDUCTIVE, PREFERABLY UNBACKED ADHESIVE TAPE WITH PERMANENT FULL-AREA PRESSURE SENSITIVE ADHESION, COMPOSED OF A FILM OF A PRESSURE SENSITIVE ADHESIVE WHICH IS PREFERABLY COATED ONTO AN ANTIADHESIVE MEDIUM AND HAS AN ALKALINE SURFACE

(75) Inventors: Uwe Schümann, Pinneberg (DE); Kirstin Weiland, Hamburg (DE); Harald Kehler, Hamburg (DE)

(73) Assignee: Tesa AG, Hamburg (DE)

( * ) Notice: Subject to any disclaimer, the term of this patent is extended or adjusted under 35 U.S.C. 154(b) by 52 days.

(21) Appl. No.: 10/190,799

(22) Filed: Jul. 8, 2002

(65) Prior Publication Data

US 2003/0059607 A1    Mar. 27, 2003

(30) Foreign Application Priority Data

Aug. 23, 2001  (DE) ................. 101 41 380
Dec. 20, 2001  (DE) ................. 101 62 613

(51) Int. Cl.
*B32B 7/12* (2006.01)
*B32B 15/00* (2006.01)

(52) U.S. Cl. ............... 428/356; 428/352; 428/355 R; 428/355 N; 156/60

(58) Field of Classification Search ............ 428/355 R, 428/356, 355 N, 343, 352; 442/151; 427/208.4; 526/931; 204/665; 156/60
See application file for complete search history.

(56) References Cited

U.S. PATENT DOCUMENTS

| | | |
|---|---|---|
| 829,691 A | 8/1906 | Clowes |
| 3,567,632 A | 3/1971 | Richter et al. ........... 210/23 |
| 3,761,307 A | 9/1973 | Dahl ........... 117/122 |
| 3,930,102 A | 12/1975 | Müller et al. ........... 428/354 |
| 4,661,542 A | 4/1987 | Gilch et al. ........... 524/59 |
| 5,807,637 A | 9/1998 | Schümann et al. ........... 428/423.1 |
| 6,129,983 A | 10/2000 | Schümann et al. ........... 428/343 |
| 6,503,620 B1 * | 1/2003 | Xie et al. ........... 428/354 |

FOREIGN PATENT DOCUMENTS

| | | |
|---|---|---|
| DE | 19 41 022 | 6/1970 |
| DE | 21 39 640 | 2/1973 |
| DE | 24 25 218 A1 | 2/1975 |
| DE | 196 14 620 A1 | 10/1997 |
| DE | 197 33 014 A1 | 2/1999 |
| DE | 198 07 295 A1 | 8/1999 |
| DE | 198 10 449 A1 | 9/1999 |
| DE | 198 22 054 A1 | 11/1999 |
| DE | 198 22 055 A1 | 11/1999 |
| DE | 199 12 628 A1 | 1/2000 |
| EP | 0 305 175 A1 | 3/1989 |
| EP | 0 763 584 A1 | 3/1997 |
| EP | 1 094 472 A2 | 4/2001 |
| WO | WO 95/16998 | 6/1995 |
| WO | WO 96/32845 | 10/1996 |

OTHER PUBLICATIONS

Abstract of AU 5339986—corresponds to U.S. Appl. No. 4,661,542.
Abstract of JP 59105069; "Pressure Sensitive Urethane Adhesive Composition" Jun. 18, 1984.

* cited by examiner

*Primary Examiner*—Thao Tran
(74) *Attorney, Agent, or Firm*—Norris McLaughlin & Marcus P.A.

(57) ABSTRACT

A preferably unbacked adhesive tape with permanent full-area pressure sensitive adhesion, composed of a film of a pressure sensitive adhesive which is preferably coated onto an antiadhesive medium and comprises
  an alkaline, solid, pulverized, mineral filler with a weight fraction of between more than 5% by weight and 60% by weight, based on the total weight of the adhesive, so that the permanently pressure sensitively adhesive surface of the adhesive tape has a pH of more than 8, and
  a conductive additive, especially a metal powder, a powder coated with a metal, and/or metallized beads, with a weight fraction of between more than 5% by weight and 60% by weight, so that the adhesive tape is electrically conductive in the z direction, i.e., in the direction of the thickness of the tape.

23 Claims, No Drawings

ELECTRICALLY CONDUCTIVE, PREFERABLY UNBACKED ADHESIVE TAPE WITH PERMANENT FULL-AREA PRESSURE SENSITIVE ADHESION, COMPOSED OF A FILM OF A PRESSURE SENSITIVE ADHESIVE WHICH IS PREFERABLY COATED ONTO AN ANTIADHESIVE MEDIUM AND HAS AN ALKALINE SURFACE

The invention relates to an adhesive tape which is permanently pressure-sensitively adhesive over the entire surface, is preferably unbacked, and is composed of a film of a pressure sensitive adhesive which is preferably coated onto an antiadhesive medium.

Electrostatic filters in air conditioning units have the advantage over conventional mechanical filters (fabrics, paper, etc.) of a substantially reduced pressure drop, low energy costs, and less noise. Nevertheless, like the conventional filters, they too offer a nutrient medium for microorganisms, as a result of the deposited dust. The microorganisms multiply on the electrode surfaces, and finally there is detachment. The microorganisms are taken up by the flow of air and become dispersed in the interior air.

Regarding the denaturing of microorganisms in electrostatic filters there have been a series of proposed solutions. DE 198 22 055 A1, for example, specifies a denaturing electrode composed of individual denaturing layers differing in electrical resistance and in pH.

DE 198 22 054 A1 describes an electrostatic filter separation system with a denaturing neutralization chamber.

DE 299 10 747 U discloses the use of highly alkaline or acidic filter mats to solve the problem.

A porous plastic coating removable by washing and comprising a denaturizing salt, mounted on the surface of the filter, is proposed as a solution to the problem by DE 198 07 295 A1.

Although the abovementioned proposals solve the problem of the multiplication of microorganisms in electrostatic filters and their subsequent dispersion in the interior air, they have the disadvantage of lacking sufficient efficacy and of not being sufficiently cost effective. The systems are complicated and cannot be used with sufficient universality.

DE 199 12 628 A1 describes an electrically conductive adhesive sheet which is thermoplastic and heat-activatable and has the following composition:
i) a thermoplastic polymer with a fraction of from 30 to 89.9% by weight,
ii) one or more tackifying resins with a fraction of from 5 to 50% by weight and/or
iii) epoxy resins with hardeners, and possibly accelerators as well, with a fraction of from 5 to 40% by weight,
iv) silverized glass beads or silver particles with a fraction of 0.1% by weight, with very particular preference 10% by weight, to 40% by weight.

The adhesive sheet is a mixture of reactive resins which crosslink at room temperature and form a three-dimensional polymer network of high strength, and of permanently elastic elastomers, which counter any embrittlement of the product.

The particularly preferred thermoplastic polyurethanes (TPUs) are known as reaction products of polyester polyols or polyether polyols and organic diisocyanates such as diphenylmethane diisocyanate. They are composed of predominantly linear macromolecules. Such products are mostly available commercially in the form of elastic granules: for example, from Bayer AG under the trade name "Desmocoll".

The silver particles may be composed of pure silver but may also be manufactured as an alloy, which in that case should include a considerable fraction of silver in order to ensure conductivity.

The electrically conductive, thermoplastic, and heat-activatable adhesive sheet serves for the permanent bonding of two articles. In contradistinction to bonds with a pressure sensitive adhesive tape, strengths such as those required in the construction sector are achieved long-term here and are retained even under burdensome chemical, thermal or climatic conditions.

Following appropriate converting, punched portions or rolls of this adhesive sheet can be adhered at room temperature or at slightly elevated temperature to the substrate that is to be bonded (electronic component, module, etc.).

The admixed reactive resins should not undergo any chemical reaction at the slightly elevated temperature. Thus the bonding must not occur as a single-stage process; instead, for the sake of simplicity, as in the case of a pressure sensitive adhesive tape, the adhesive sheet can be attached first to one of the two substrates by thermal lamination. During the actual hot adhesive bonding process with the second substrate, the resin then cures partly or wholly and the joint achieves the high bond strength, far above that of pressure sensitive adhesive systems.

Accordingly, the adhesive sheet is particularly suitable for hot pressing at temperatures below 120° C., in particular from 80° C. to 100° C.

The use of metallic or metallized materials for achieving electrical conductivity in adhesive films is further described in EP 0 734 576 A1.

Neither the adhesive sheet nor the adhesive film, however, exhibit any properties which suggest their use against microorganisms.

DE 196 14 620 A1 discloses a pressure sensitive self-adhesive tape, coated on both sides with adhesives, whose backing is formed by a formulated, crosslinked, unfoamed polyurethane.

One constituent used for the backing is a crosslinked, unfoamed polyurethane which is formulated with additional components, namely fillers, plasticizers and resins, and also, where appropriate, further auxiliaries.

The polyurethane content of the backing is up to 50% by weight, preferably from 10% by weight to 40% by weight. The fillers make up from 40% by weight to 70% by weight of the backing, while the plasticizers and resins are used together at from 5% by weight to 30% by weight, in particular from 10% by weight to 25% by weight.

The selection of the isocyanate component of the polyurethane is governed by the specific properties to be established in the backing. Suitable examples include tolylene diisocyanate, diphenylmethane 4,4'-diisocyanate, dicyclohexylmethane-4,4'-diisocyanate, hexamethylene diisocyanate, isophorone diisocyanate, mixtures of said isocyanates or isocyanates derived chemically from them, dimerized or trimerized types, for example.

The selection of the isocyanate-reactive component is likewise governed by the properties of the backing that are to be established as a function of the desired profile of requirements. Suitable examples include all polyesterdiols, -triols, and -polyols, polyetherdiols, -triols and -polyols.

In one particularly preferred embodiment of the self-adhesive tape the polyurethane is formed using a hydroxyl-functionalized polybutadiene in conjunction with a diisocyanate.

Fillers which can be used include both reinforcing fillers, such as carbon black, for example, and nonreinforcing fillers, such as chalk or barium sulfate, for example. Further examples are talc, mica, silica, silicates or zinc oxide. Mixtures of said substances may also be used.

Examples of plasticizers are phthalates and paraffinic, naphthenic or aromatic mineral oils. Resins which can be used include phenolic resins, hydrocarbon resins or bitumen.

Adhesives which can be used include rubber-based or acrylate-based adhesives of which there was general prior knowledge.

DE 197 33 014 A1 likewise discloses a pressure sensitive, double-sided self-adhesive tape comprising a backing coated on both sides with pressure sensitive adhesives and composed a) in a weight fraction of up to 50% by weight, in particular from 30% by weight to 40% by weight, of a crosslinked, unfoamed polyurethane,
  i) formed from hydroxyl-functionalized polybutadiene, polyesterdiol, polyestertriol, polyesterpolyol, polyetherdiol, polyethertriol or polyetherpolyol, polyetherdiamine, polyethertriamine, polyetherpolyamine and also monohydric alcohol (monool), monofunctional amine (monoamine), polyethermonool, polyethermonoamine, or of products derived from the four last-mentioned groups
  ii) and of diisocyanate or chemically derived isocyanate,
  iii) the polyurethane being plasticizer-free,
b) in a weight fraction of from 50% by weight to 70% by weight of fillers,
c) if desired, of further auxiliaries.

This adhesive tape differs from that of DE 196 14 620 A1 in that it is plasticizer-free.

The self-adhesive tapes disclosed here, consisting essentially of a laminate comprising a formulated polyurethane composition and a pressure sensitive adhesive film necessarily have a three-layer construction: adhesive film/formulated polyurethane composition/adhesive film.

It is an object of the invention to develop a preferably unbacked, double-sided adhesive tape for attachment to the electrodes of electrostatic filters in air conditioning units which in order to ensure the electrical functionality of the electrostatic filters is electrically conductive in the z direction and at the same time possesses a surface which both has permanent inherent adhesiveness or pressure-sensitive adhesiveness and is permanently alkaline, so that microorganisms can be picked up from the stream of air and cured or hindered in their further multiplication. Moreover, it ought to be possible to wash the surface of the adhesive tape with mains water so that following dust accumulation or other soiling occurring unavoidably over the course of time, the original pressure sensitive adhesiveness can be reestablished.

This object is achieved by means of an unbacked adhesive tape as specified in the main claim. The subclaims embrace advantageous embodiments thereof and also one particularly appropriate application.

The invention accordingly provides a preferably unbacked adhesive tape with permanent full-area pressure sensitive adhesion, composed of a film of a pressure sensitive adhesive which is preferably coated onto an antiadhesive medium and comprises an alkaline, solid, pulverized, mineral filler with a weight fraction of between more than 0% by weight and 60% by weight, based on the total weight of the adhesive, so that the permanently pressure sensitively adhesive surface of the adhesive tape has a pH of more than 8, and a conductive additive, especially a metal powder, a powder coated with a metal, and/or metallized beads, with a weight fraction of between more than 0% by weight and 60% by weight, so that the adhesive tape is electrically conductive in the z direction, i.e., in the direction of the thickness of the tape.

In one first advantageous embodiment of the adhesive tape the particle diameter of the mineral filler, based on at least 80% of said particles, is not more than 0.5 mm, preferably not more than 0.1 mm.

In another advantageous embodiment of the adhesive tape the particle diameter of the conductive additive, based on at least 80% of said particles, is at least 30% of the thickness of the pressure sensitive adhesive film, preferably at least 70% of the thickness of said film.

It is further advantageous if the weight fraction of the mineral filler is from 5% by weight to 40% by weight, preferably from 5% by weight to 30% by weight, with very particular preference from 5% by weight to 20% by weight, based on the total weight of the pressure sensitive adhesive.

It is further advantageous if the weight fraction of the conductive additive is from 10% by weight to 30% by weight, based on the total weight of the pressure sensitive adhesive.

Suitable base polymers for the pressure sensitive adhesive of the preferably unbacked adhesive tape include all elastomers customary in the formulation of pressure sensitive adhesives.

Preferred elastomers are copolymers based on acrylic acid, methacrylic acid and their esters, maleic, fumaric, and itaconic acid and their esters, substituted (meth)acrylamides, other vinyl compounds, such as vinyl esters, vinyl acetate, vinyl alcohol and/or the esters thereof, for example, natural rubber, styrene block copolymers, polybutadiene, polyisoprene, polychloroprene rubber, butyl rubber, silicone rubber, EPDM rubber, ethylene-propylene copolymers, polyurethanes, vinyl copolymers, ethylene-vinyl acetate copolymers, vinyl chloride-acrylate copolymers, polyether esters, polyether amides and polyester amides, polycarbonate-polyester copolymers, ethylene-acrylate copolymers, and ABS copolymers.

The aforementioned elastomers may also be used as a constituent in polymer blends.

The base polymers may be compounded appropriately with resins or other blending components, such as fillers, plasticizers, pigments, stabilizers, catalysts, aging inhibitors, light stabilizers or UV stabilizers, for example.

Fillers which can be used include both reinforcing fillers, such as carbon black, and nonreinforcing fillers, such as chalk, barium sulphate or zinc oxide, for example.

The function of the light stabilizers is primarily to prevent embrittlement of the adhesive tape. Light stabilizers of this kind are described in Gaechter and Müller, Taschenbuch der Kunststoff-Additive, Munich 1979, in Kirk-Othmer (3rd) 23, 615–627, in Encycl. Polym. Sci. Technol. 14, 125–148, and in Ullmann (4th) 8, 21; 15, 529, 676. HALS stabilizers in particular are suitable for the adhesive tape of the invention. The amount of light stablizer should be at least 0.15% by weight, preferably at least 0.30% by weight, based on the pressure sensitive adhesive.

The use of antioxidants is advantageous but not mandatory. Further suitable UV absorbers, light stabilizers, and aging inhibitors are listed in EP 0 763 584 A1, which is hereby incorporated by reference to become part of this disclosure.

In one particularly preferred embodiment, the base polymer of the pressure sensitive adhesive of the preferably unbacked adhesive tape is polyurethane.

The polyurethane-based pressure sensitive adhesive can be prepared using both aliphatic and aromatic isocyanates.

Suitable examples include isophorone diisocyanate, hexamethylene diisocyanate, dicyclohexylmethane 4,4'-diisocyanate, tolylene diisocyanate, diphenylmethane 4,4'-diisocyanate or m-tetramethylxylene diisocyanate, mixtures of said isocyanates or isocyanates derived chemically therefrom, dimerized, trimerized or polymerized types for example, containing for example urea groups, uretdione groups or isocyanurate groups.

As the isocyanate component it is also possible, furthermore, to use prepolymers, in other words reaction products of isocyanate and polyol prepared beforehand in an NCO/OH ratio of more than one.

In one preferred embodiment the polyol component used comprises polypropylene glycols, polyethylene glycols, hydrogenated, hydroxyl-functionalized polyisoprenes, hydroxyl-functionalized polyisobutylenes or hydroxyl-functionalized polyolefins. Also suitable are hydroxyl-functionalized polybutadienes and other, hydrogenated and nonhydrogenated, hydroxyl-functionalized hydrocarbons. Polytetramethylene glycol ethers (polytetrahydrofurans) are likewise suitable. Suitability extends to polyesterpolyols and also mixtures of the aforementioned polyol components. As the polyol component it is likewise possible to use reaction products of isocyanate and polyol prepared beforehand in an NCO/OH ratio of less than 1. Known chain extenders, short-chain crosslinkers or terminators may likewise be used in forming the polyurethane layer.

In order to achieve an appropriate coating viscosity, the polyurethane components may also be diluted with solvents.

Besides the isocyanate components listed and the polyol components which react with them, other starting materials may also be used for forming the polyurethane without departing from the concept of the invention. In particular, amine-functionalized components, such as polyether amines or amino-containing chain extenders or crosslinkers, for example, may be employed in preparing the polyurethane-based pressure sensitive adhesive.

In order to accelerate the reaction between the isocyanate component and the isocyanate-reactive component, it is possible to use any catalysts known to the skilled worker, such as tertiary amines, organobismuth compounds or organotin compounds, for example, Polyurethanes as above are prior art in terms of their preparation and are described, for example, in "Ullmann's Encyclopedia of Industrial Chemistry", Vol. A21: Polyurethanes.

In one possible embodiment the polyurethane-based pressure sensitive adhesive comprises other formulating ingredients, such as fillers, pigments, rheological additives, plasticizers, resins (tackifiers), elastomers, aging inhibitors (antioxidants), light stabilizers, UV absorbers, and other auxiliaries and additives, such as driers (for example, molecular sieve zeolites, calcium oxide), flow control agents and leveling agents, wetting agents (surfactants) or catalysts, for example.

Fillers which can be used include all finely ground solid additives such as, for example, chalk, magnesium carbonate, zinc carbonate, kaolin, barium sulfate or titanium dioxide. Further examples are talc, mica, silica, silicates or zinc oxide. Mixtures of said substances can also be used.

The pigments used may be organic or inorganic in nature. Examples are all types of organic or inorganic color pigments, especially white pigments such as titanium dioxide, for instance.

Examples of rheological additives are pyrogenic silicas, phyllosilicates (bentonites), high molecular mass polyamide powders or castor oil derivative powders.

Examples of plasticizers are phthalates, trimellitates, phosphates, esters of adipic acid, and other acyclic dicarboxylate esters, fatty acid esters, hydroxycarboxylic esters, alkylsulfonic esters of phenol, aliphatic, cycloaliphatic, and aromatic mineral oils, hydrocarbons, liquid or semisolid rubbers (for example, nitrile rubbers or polyisoprene rubbers), liquid or semisolid polymers of butene and/or isobutene, acrylates, polyvinyl ethers, liquid resins and soft resins based on the raw materials which are also the basis for tackifier resins, wool wax and other waxes, silicones, and polymer plasticizers such as polyesters or polyurethanes. Particularly suitable plasticizers are aging-stable plasticizers without an olefinic double bond.

Suitable resins (tackifiers) are all natural and synthetic resins, such as rosin derivatives (for example, derivatives formed by disproportionation, hydrogenation or esterification), coumarone-indene resins and polyterpene resins, aliphatic or aromatic hydrocarbon resins (C-5, C-9, $(C-5)_2$ resins), mixed C-5/C-9 resins, hydrogenated and partially hydrogenated derivatives of said types, resins of styrene or α-methyl styrene, and also terpene-phenolic resins and others as listed in Ullmann's Enzyklopädie der technischen Chemie, Volume 12, pp. 525 to 555 (4th ed.), Weinheim.

The particularly preferred base polymer of the polyurethane pressure sensitive adhesive may be blended with suitable elastomers, such as are listed individually above, in polymer blends.

It is particularly preferred if more than 50% by weight of the polymer basis of the pressure sensitive adhesive comprises polyurethane.

The use of antioxidants, such as sterically hindered phenols (Irganox 1010 or trisnonylphenyl phosphite) is advantageous in the polyurethane-based pressure sensitive adhesive as well, although not mandatory.

Light stabilizers and UV absorbers can also be used, but are not needed.

Light stabilizers used likewise include those disclosed in Gaechter and Müller, Taschenbuch der Kunststoff-Additive, Munich 1979, in Kirk-Othmer (3rd) 23, 615–627, in Encycl. Polym. Sci. Technol. 14, 125–148, and in Ullmann (4th) 8, 21; 15, 529, 676.

Formulating the polyurethanes with further ingredients, such as fillers and plasticizers, for example, is employed in particular when preparing sealants (cf. Ullmann's Encyclopedia of Industrial Chemistry, Vol. A 23: Sealing Materials).

An exemplary listing of documents giving information on formulating and preparing polyurethane-based pressure sensitive adhesives comprises U.S. Pat. No. 3,930,102 A1, AU 86 53399 A1, JP 59 105 069 A1, U.S. Pat. No. 829,691 Al, DE 24 35 218 A1, DE 21 39 640 A1, DE 19 41 022 A1, EP 0 305 175 A1, EP 0 882 749 A1 and U.S. Pat. No. 3,761,307 A1.

In a further preferred embodiment, the polyurethane is formed with an NCO/OH ratio of from 0.6 to 1.2.

Moreover, the polyurethane-based pressure sensitive adhesive may also have been foamed. Both chemical and physical foaming techniques are possible.

As an alkaline filler, all minerals whose pH on wetting with water is more than 8 are suitable. Examples are metal oxides, especially alkali metal and alkaline earth metal oxides, metal hydroxides, especially alkali metal and alkaline earth metal hydroxides, carbonates, phosphates, and cyanides, especially those in each case of the alkali metals and alkaline earth metals, and also mixtures of these fillers or mixtures of these and other fillers.

Suitable metal powders include in particular copper, silver, gold, aluminum, nickel, chromium, iron or alloys or mixtures thereof. Metallized powders or beads include all mineral or glass-based or plastic-based powders or beads, respectively, which have been coated in whole or in part with a metal.

A coarse mesh or weave may have been let into the pressure sensitive adhesive film, or similar sheetlike structures such as perforated polymer films.

It is important that the bodies let into the pressure sensitive adhesive film do not restrict the functional capacity of the adhesive tape of the invention, and especially not the conductivity.

In order to establish the desired pressure sensitive adhesion properties, the pressure sensitive adhesive may be chemically or physically crosslinked. Radiation crosslinking (by EBC or UV, for example) is likewise possible.

The pressure sensitive adhesion exists permanently over the entire surface of the adhesive tape. Even prolonged storage periods of up to one year do not lead to any detractions in terms of pressure sensitive adhesion.

At the same time, depending on the nature and concentration of the alkaline filler, pH values of between 8.5 and 12 are measured with moistened pH paper. It is preferable if the pH of the pressure sensitive adhesive surface, especially when moistened, is at least 8.5 or more.

The volume resistance in the z direction, depending on the nature and concentration of the metal powder, is from 0.05 to 500 $\Omega$m. It is preferred for the volume resistance of the pressure sensitive adhesive film in the z direction to be not more than 500 $\Omega$m, and further preferred if the volume resistance of the polyurethane-based pressure sensitive adhesive film in the z direction is not more than 1 000 $\Omega$m.

Where the pressure sensitive adhesive film takes on any amount of dust, road dirt, earth, sand, fat, oil or other substances which reduce the pressure sensitive adhesion, it can easily be cleaned again using normal mains water, so that afterward the full, original pressure sensitive adhesion is reestablished and the adhesive tape, especially with the polyurethane-based pressure sensitive adhesive film, can be used again without restriction.

It is further advantageous if the bond strength of the pressure sensitive adhesive film is at least 0.1 N/cm; in the case of the polyurethane-based pressure sensitive adhesive film it is advantageous if said bond strength is with particular preference at least 0.01 N/cm.

In the rolling ball tack test, at least a figure of 100 mm or less is achieved; with particular preference, in the case of the polyurethane-based pressure sensitive adhesive film, at least a figure of 300 mm or less.

The combination of properties represented by pressure sensitive adhesion, alkalinity, washability, and electrical conductivity in the z direction advantageously exists uninterrupted over the entire surface area of the adhesive tape and not just in segments or sections.

The coating of the pressure sensitive adhesive onto an anti-adhesive medium, like the compounding of the pressure sensitive adhesive, may take place from a solution or a dispersion. Alternatively, a solvent-free process is possible in which, for example, for the purpose of coating, the pressure sensitive adhesive is melted (extrusion, calender or roll process) or in which it is only prepared immediately prior to coating by the mixing of two or more chemically reactive components and thus comes about chemically only during the coating phase (multicomponent reactive process).

Reference may be made to a detailed depiction of the state of knowledge regarding the topic of pressure sensitive adhesives in the "Handbook of Pressure Sensitive Adhesive Technology", Third Edition, by Donatas Satas (Satas & Associates, 1999).

A suitable antiadhesive medium comprises all films or papers from which, following application, the pressure sensitive adhesive can be removed again without destruction or damage; in other words, for example, films or papers which owing to their material properties are already sufficiently antiadhesive or which have been provided with an antiadhesive coating such as silicone, polytetrafluoroethylene or polyethylene, for instance.

The antiadhesive medium coated with the pressure sensitive adhesive is preferably wound into a roll. For better protection, the pressure sensitive adhesive may also be lined from the exposed side with a second antiadhesive medium, which need not be identical with the first.

Surprisingly and unforeseeably for the skilled worker, an unbacked pressure sensitive adhesive film which comprises an alkaline, solid, pulverized, mineral filler whose particle diameter, based on at least 80% of these particles, is not more than 0.5 mm, with a weight fraction of between more than 0% by weight and 60% by weight, based on the total weight of the pressure sensitive adhesive, and further comprising, with a weight fraction of between greater than 0% by weight and 60% by weight, a conductive additive such as a metal powder, a metal-coated powder of any other kind and/or metallized beads (for example, metallized glass beads) whose particle diameter, based on at least 80% of these particles, is at least 30% of the thickness of the pressure sensitive adhesive film proves outstandingly suitable for achieving the set objectives, particularly in view of the inventive combination of the properties of electrical conductivity in the z direction with both permanent inherent adhesion and permanent pressure sensitive adhesion and the permanently alkaline surface in the adhesive tape of the invention.

Moreover, especially when it has a polyurethane-based pressure sensitive adhesive film, the adhesive tape of the invention can be cleaned with normal mains water when contaminated with dust or otherwise soiled, and afterward can be used again to its full extent.

On the basis of the combination of electrical conductivity, permanent pressure sensitive adhesion, and alkalinity, an adhesive tape of this kind is suitable for application to collecting electrodes of electrostatic filters in air conditioning units.

The tape ensures the basic electrical function of the electrofilter, picks up microorganisms (bacteria, viruses, fungi, etc.) from the flow of air, prevents their further multiplication or brings about their denaturization, and is regenerable by cleaning with mains water following dust contamination or any other soiling; that is, the original pressure sensitive adhesion, in combination with the surface alkalinity, can be reestablished.

For application in service, the adhesive tape is adhered directly to the substrate and then the antiadhesive medium is peeled off. A stabilizing backing, such as is customary with the majority of adhesive tapes, and which gives the adhesive tape internal strength and is permanently and fixedly connected to the pressure sensitive adhesive, is not mandatory in the adhesive tape.

The adhesive tape of the invention is described below in a preferred embodiment, exemplified by a number of examples, without wishing thereby to restrict the invention in any way whatsoever. Also given are comparative examples, which illustrate unsuitable adhesive tapes.

The following test methods are used to give a brief characterization of the specimens produced by the process described:

The bond strength is determined in accordance with BDF JOPMA002. In this method, an unbacked pressure sensitive adhesive film is initially bonded to a 26 μm polyester film. The pressure sensitive adhesive film/polyester film assembly is then applied to the substrate (steel) and subsequently peeled off under defined conditions using a tensile testing machine. The peel angle is in each case 180°, the peel rate 300 mm/min. The force required for peel removal is the bond strength.

The tack (surface tackiness) is measured by the rolling ball method in accordance with BDF test specification JOPM 0075.

The measurement apparatus consists, accordingly, essentially of an inclined plane, a steel ball, and a defined stainless steel substrate. The steel ball of 5.6 g (11 mm in diameter) rolls down the inclined plane (height 65 mm) at an angle of 21.5° onto the pressure sensitive adhesive and is braked by said adhesive by virtue of its pressure sensitive adhesion. The distance traveled by the ball on the surface of the adhesive is taken as a measure of the tack. Accordingly, the tack is inversely proportional to the distance traveled.

The pH is determined by applying pH paper, wetted with distilled water, to the surface of the adhesive, following an exposure time of 10 minutes.

The volume resistance in the z direction, i.e., in the direction of the thickness of the pressure sensitive adhesive film, is measured in accordance with ASTM-D-2739 with a weight load of 4 kg.

The coating of the pressure sensitive adhesive onto the antiadhesive medium (as a general rule, siliconized release paper) takes place using a commercial coating machine from BASF or, in the case of hotmelt pressure sensitive adhesives, with an extruder from Werner & Pfleiderer at temperatures from 170° C. to 200° C. using a slot die. In each case, specimens of the individual pressure sensitive adhesives measuring 25×30 cm are produced. The thickness of the adhesive films can be chosen freely and is set at between 0.04 mm and 0.8 mm.

Preparation of the natural rubber-based and EVA-based pressure sensitive adhesives and of the hotmelt pressure sensitive adhesives takes place in commercial compounders from Stephan or AMK.

The acrylate-based pressure sensitive adhesives are produced in a stirred tank reactor from Juchheim.

The A components of the solvent-free polyurethane pressure sensitive adhesives are prepared in a commercial dissolver from Molteni. Mixing with the B component (the isocyanate) immediately prior to coating takes place using a two-component mixing and metering unit from Spritztechnik-EMC.

The polyurethane-based pressure sensitive adhesives are prepared solventlessly in a two-component reactive process. For this purpose, in the examples, the A component in each case is first prepared by mixing the corresponding starting materials in a commercial evacuatable dissolver from Molteni. In order to ensure no bubbles are present, this is done with application of vacuum. The mixing time is in each case approximately 2 hours.

Mixing with the B component (the isocyanate) immediately prior to coating takes place using a two-component mixing and metering unit from Spritztechnik-EMC. The mixing system is dynamic. The mixing head is designed for two liquid components. The mixing rotor has a variable speed of up to max. approx. 5 000 rpm. The metering pumps of this unit are gear pumps with a capacity of max. approx. 2 l/min.

The mixture is applied to siliconized release paper.

The chemical reaction of the two mixed components to give the pressure sensitive adhesive takes place at 70° C. in a drying oven.

EXAMPLES

The adhesive tape of the invention is described on the basis of five exemplary, known pressure sensitive adhesives (PSAs) differing in their polymer and/or raw material basis, which are described below. These formulas form the basis for the individual examples 1 to 25, in which the adhesive tape of the invention is described, and for the comparative examples.

Known PSA 1:

(Based on acrylate copolymer)

A 2 l reactor conventional for radical polymerizations is charged with 20 g of hydroxypropyl acrylate
60 g of methyl acrylate
210 g of ethylhexyl acrylate
210 g of butyl acrylate
300 g of acetone/special boiling point spirit 60/95 (1:1).

Nitrogen gas is passed through the reactor with stirring for 45 minutes and then the reactor is heated to 58° C. and 0.2 g of azoisobutyronitrile (AIBN) is added. Thereafter, the external heating bath is heated to 75° C. and the reaction is carried out constantly at this temperature.

After a reaction time of 1 hour a further 0.2 g of AIBN is added.

After 2.5 hours and 5 hours, in each case 150 g of acetone/special boiling point spirit 60/95 (1:1) are added for dilution.

The reaction is terminated after a time of 48 hours and the product is cooled to room temperature.

Following the addition of the alkaline filler and of the metal powder (see the individual examples), 2.5 g of Desmodur Z® are added, based on the above proportions.

Known PSA 2:

(Based on natural rubber)

A PSA prepared in a compounder by conventional methods is used, with the following composition:

| Weight fraction (% by wt.) | Trade name | Chemical basis | Manufacturer/Supplier |
|---|---|---|---|
| 46.0 | Natural rubber SMR CV50 ® | Natural rubber | Weber & Schaer |
| 26.0 | Zonarez B 115 S ® | Poly-beta-pinene resin | Arizona |
| 10.0 | Dertophene T 110 ® | Terpene-phenolic resin | DRT |

-continued

| Weight fraction (% by wt.) | Trade name | Chemical basis | Manufacturer/ Supplier |
|---|---|---|---|
| 7.0 | Resin 731 D ® | Rosin | Abieta |
| 7.0 | Nipol 1312 LV ® | Acrylonitrile-butadiene copolymer | Zeon |
| 3.0 | Zinc oxide Weiβsiegel ® | Zinc oxide | Grillo |
| 1.0 | Irganox 1010 ® | Sterically hindered phenol | Ciba-Geigy |

The PSA is prepared and used at a concentration of 20% in petroleum spirit/ethanol (100:5).

Known PSA 3:

(Based on styrene block copolymer)

A PSA prepared in a compounder by conventional methods is used in solvent-free form, with the following composition:

| Weight fraction (% by wt.) | Trade name | Chemical basis | Manufacturer/ Supplier |
|---|---|---|---|
| 45.0 | Vector 4113 ® | Styrene-isoprene-styrene block copolymer | Exxon Mobil |
| 45.0 | Escorez 2203 ® | Aromatic-modified C-5 hydrocarbon resin | Exxon Mobil |
| 9.0 | Ondina G41 ® | White oil | Shell Chemicals |
| 1.0 | Irganox 1010 ® | Sterically hindered phenol | Ciba-Geigy |

Known PSA 4:

(Based on EVA)

A PSA prepared in a compounder by conventional methods, is used at a concentration of 30% in toluene, with the following composition:

| Weight fraction (% by wt.) | Trade name | Chemical basis | Manufacturer/ Supplier |
|---|---|---|---|
| 70.0 | Levapren 456 ® | Polyethylene-vinyl acetate with a vinyl acetate content of 45% | Bayer |
| 30.0 | Foral 85 ® | Hydrogenated rosin ester | Hercules/Eastman |

Known PSA 5:

(Based on polyurethane)

The following raw materials form the A component of the two-component PSA and are mixed solventlessly by known methods in a dissolver for 2 hours, with application of vacuum for devolatilization.

A Component:

| Weight fraction (% by wt.) | Trade name | Chemical basis | Manufacturer/ Supplier |
|---|---|---|---|
| 6.4 | Arcol 1004 ® | Polypropylene glycol, diol | Bayer |
| 88.5 | Baycoll BT 5031 ® | Polypropylene glycol, triol | Bayer |
| 4.8 | Aerosil R202 ® | Hydrophobicized pyrogenic silica | Degussa |
| 0.3 | Mark DBTL ® | Dibutyltin dilaurate | Nordmann, Rassmann |

The B component is isophorone diisocyanate (trade name: Vestanat IPDI, manufacturer: Hüls). 7.8 parts of IPDI are required per 100 parts of the above A component. The NCO/OH ratio is then 0.95. The B component is not added until after the alkaline filler and the metal powder (see individual examples) have been added, immediately prior to coating, using a two-component mixing and metering unit.

For the description of the adhesive tape of the invention, in the examples the following alkaline fillers are used:

TABLE 1

Alkaline fillers used in the examples

| Trade name | Chemical basis/ description | Manufacturer/ Supplier | Diameter of at least 80% of the particles |
|---|---|---|---|
| Weiβfeinkalk ® | Calcium oxide powder | RWK | <0.1 mm |
| Sodium carbonate powder | Sodium carbonate powder | Aldrich | <0.5 mm |
| Sodium carbonate granules | Sodium carbonate granules | Aldrich | >0.5 mm |
| Potassium carbonate powder | Potassium carbonate powder | Aldrich | <0.5 mm |

For the description of the adhesive tape of the invention, additionally, in the examples the following metal powders are used:

TABLE 2

Metal powders used in the examples

| Trade name | Metal/description | Manufacturer/ Supplier | Diameter of at least 80% of the particles |
|---|---|---|---|
| ECKA copper CH-S 24 ® | Dendritic copper powder | Eckart | <0.16 mm |
| ECKA copper CH-S No. 34862/ G AG 5 ® | Dendritic copper powder with silver coating | Eckart | <0.045 mm |
| STANDART aluminum powder Lack NOT ® | Aluminum powder in leaf form | Eckart | <0.125 mm |
| CONDUKT-O-FIL S-3000-S3M ® | Silver-coated glass beads | Potters-Ballotini | <0.05 mm |

Example 1

The PSA of the adhesive tape of the invention has the following composition:

65% by weight solids of the known PSA 1

15% by weight sodium carbonate powder

20% by weight ECKA copper CH-S 24®

For its preparation, 115 g of sodium carbonate powder and 154 g of ECKA copper CH-S 24® are added to 1 100 g of the cooled solution of the known PSA 1 (corresponding to 500 g of solids). Following the addition of Desmodur Z®, the mixture is stirred for 1 hour.

The PSA is then applied from solution to a siliconized release paper, and drying and crosslinking take place in a drying oven initially at 60° C. and after 10 minutes at 120° C.

The thickness of the PSA film is set at
a) 0.06 mm and at
b) 0.1 mm.

The bond strength of the PSA film is
a) 1.3 N/cm,
b) 1.6 N/cm.

The rolling ball tack figures are:
a) 25 mm,
b) 18 mm.

The pH is in each case from 9.0 to 9.5.
The volume resistance in the z direction is:
a) 0.5 Ωm,
b) 3.1 Ωm.

After a storage time of one year the figures are unchanged.

Example 2

The PSA of the adhesive tape of the invention has the following composition:
65% by weight solids of the known PSA 1
15% by weight Weißfeinkalk®
20% by weight ECKA copper CH-S 24®

For its preparation, 115 g of Weißfeinkalk® and 154 g of ECKA copper CH-S 24® are added to 1 100 g of the cooled solution of the known PSA 1 (corresponding to 500 g of solids). Following the addition of Desmodur Z®, the mixture is stirred for 1 hour.

The PSA is then applied from solution to a siliconized release paper, and drying and crosslinking take place in a drying oven initially at 60° C. and after 10 minutes at 120° C.

The thickness of the PSA film is set at a) 0.06 mm and at b) 0.1 mm.

The bond strength of the PSA film is a) 1.1 N/cm and b) 1.3 N/cm.

The rolling ball tack figures are a) 39 mm and b) 25 mm.
The pH is in each case from 10.0 to 10.5.
The volume resistance in the z direction is a) 0.4 Ωm and b) 2.4 Ωm.

After a storage time of one year the figures are unchanged.

Example 3

The PSA of the adhesive tape of the invention has the following composition:
65% by weight solids of the known PSA 1
15% by weight of Weißfeinkalk®
20% by weight of CONDUKT-O-FIL S-3000-S3M®

For its preparation, 115 g of Weißfeinkalk® and 154 g of CONDUKT-O-FIL S-3000-S3M® are added to 1 100 g of the cooled solution of the known PSA 1 (corresponding to 500 g of solids). Following the addition of Desmodur Z®, the mixture is stirred for 1 hour. The PSA is then applied from solution to a siliconized release paper, and drying and crosslinking take place in a drying oven initially at 60° C. and after 10 minutes at 120° C.

The thickness of the PSA film is set at a) 0.06 mm and at b) 0.1 mm.

The bond strength of the PSA film is a) 0.9 N/cm and b) 1.2 N/cm.

The rolling ball tack figures are a) 33 mm and b) 26 mm.
The pH is in each case from 9.5 to 10.0.
The volume resistance in the z direction is a) 1.4 Ωm and b) 27.1 Ωm.

After a storage time of one year the figures are unchanged.

Example 4

The PSA of the adhesive tape of the invention has the following composition:
65% by weight solids of the known PSA 2
15% by weight sodium carbonate powder
20% by weight ECKA copper CH-S 24®

For its preparation, 15 g of sodium carbonate powder and 20 g of ECKA copper CH-S 24® are added to 325 g of the known PSA 2 present in 20% strength petroleum spirit/ethanol solution (corresponding to 65 g of solids).

After a kneading time of 1 hour, the PSA is applied from solution to a siliconized release film and is dried in a drying oven first at 60° C. and after 10 minutes at 110° C.

The thickness of the PSA film is set at a) 0.06 mm and at b) 0.1 mm.

The bond strength of the PSA film is a) 1.4 N/cm and b) 1.8 N/cm.

The rolling ball tack figures are a) 20 mm and b) 15 mm.
The pH is in each case from 8.5 to 9.0.
The volume resistance in the z direction is a) 0.7 Ωm and b) 1.4 Ωm.

After a storage time of one year the figures are unchanged.

Example 5

The PSA of the adhesive tape of the invention has the following composition:
65% by weight solids of the known PSA 2
15% by weight sodium carbonate/potassium carbonate powder (mixing ratio 1:1)
20% by weight ECKA copper CH-S 24®

For its preparation, 15 g of sodium carbonate/potassium carbonate powder (mixing ratio 1:1) and 20 g of ECKA copper CH-S 24® are added to 325 g of the known PSA 2 present in 20% strength petroleum spirit/ethanol solution (corresponding to 65 g of solids).

After a kneading time of 1 hour, the PSA is applied from solution to a siliconized release film and is dried in a drying oven first at 60° C. and after 10 minutes at 110° C.

The thickness of the PSA film is set at a) 0.06 mm and at b) 0.1 mm.

The bond strength of the PSA film is a) 1.3 N/cm and b) 1.6 N/cm.

The rolling ball tack figures are a) 18 mm and b) 13 mm.
The pH is in each case from 8.5 to 9.0.
The volume resistance in the z direction is a) 0.6 Ωm and b) 1.3 Ωm.

After a storage time of one year the figures are unchanged.

Example 6

The PSA of the adhesive tape of the invention has the following composition:
65% by weight solids of the known PSA 2
15% by weight Weißfeinkalk®
20% by weight ECKA copper CH-S No. 34862/G AG 5®

For its preparation, 15 g of Weißfeinkalk® and 20 g of ECKA copper CH-S No. 34862/G AG 5® are added to 325 g of the known PSA 2 present in 20% strength petroleum spirit/ethanol solution (corresponding to 65 g of solids).

After a kneading time of 1 hour, the PSA is applied from solution to a siliconized release film and is dried in a drying oven first at 60° C. and after 10 minutes at 110° C.

The thickness of the PSA film is set at a) 0.06 mm and at b) 0.1 mm.

The bond strength of the PSA film is a) 1.4 N/cm and b) 1.7 N/cm.

The rolling ball tack figures are a) 20 mm and b) 16 mm.

The pH is in each case from 9.5 to 10.0.

The volume resistance in the z direction is a) 2.4 Ωm and b) 36.1 Ωm.

After a storage time of one year the figures are unchanged.

Example 7

The PSA of the adhesive tape of the invention has the following composition:
65% by weight known PSA 3
15% by weight Weißfeinkalk®
20% by weight ECKA copper CH-S 24®

For its preparation, 750 g of Weißfeinkalk® and 1 000 g of ECKA copper CH-S 24® are added to 3 250 g of the known PSA 3.

After a kneading time of 1 hour, the PSA is applied by the extrusion process to a siliconized release film.

The thickness of the PSA film is set at a) 0.06 mm and at b) 0.1 mm.

The bond strength of the PSA film is a) 2.2 N/cm and b) 2.9 N/cm.

The rolling ball tack figures are a) 18 mm and b) 7 mm.

The pH is in each case from 9.5 to 10.0.

The volume resistance in the z direction is a) 0.5 Ωm and b) 1.3 Ωm.

After a storage time of one year the figures are unchanged.

Example 8

The PSA of the adhesive tape of the invention has the following composition:
65% by weight known PSA 3
15% by weight Weißfeinkalk®
20% by weight ECKA copper CH-S No. 34862/G AG 5®

For its preparation, 750 g of Weißfeinkalk® and 1 000 g of ECKA copper CH-S No. 34862/G AG 5® are added to 3 250 g of the known PSA 3.

After a kneading time of 1 hour, the PSA is applied by the extrusion process to a siliconized release film.

The thickness of the PSA film is set at a) 0.06 mm and at b) 0.1 mm.

The bond strength of the PSA film is a) 2.4 N/cm and b) 2.8 N/cm.

The rolling ball tack figures are a) 16 mm and b) 9 mm.

The pH is in each case from 9.5 to 10.0.

The volume resistance in the z direction is a) 1.8 Ωm and b) 20.4 Ωm.

After a storage time of one year the figures are unchanged.

Example 9

The PSA of the adhesive tape of the invention has the following composition:
65% by weight known PSA 3
15% by weight Weißfeinkalk®
20% by weight STANDART aluminum powder Lack NOT®

For its preparation, 750 g of Weißfeinkalk® and 1 000 g of STANDART aluminum powder Lack NOT® are added to 3 250 g of the known PSA 3.

After a kneading time of 1 hour, the PSA is applied by the extrusion process to a siliconized release film.

The thickness of the PSA film is set at a) 0.06 mm and at b) 0.1 mm.

The bond strength of the PSA film is a) 1.7 N/cm and b) 1.9 N/cm.

The rolling ball tack figures are a) 25 mm and b) 17 mm.

The pH is in each case from 9.5 to 10.0.

The volume resistance in the z direction is a) 85.6 Ωm and b) 130.3 Ωm.

After a storage time of one year the figures are unchanged.

Example 10

The PSA of the adhesive tape of the invention has the following composition:
65% by weight solids of the known PSA 4
15% by weight Weißfeinkalk®
20% by weight ECKA copper CH-S 24®

For its preparation, 21 g of Weißfeinkalk® and 28 g of ECKA copper CH-S 24® are added to 300 g of the known PSA 4 present at a concentration of 30% in toluene (corresponding to 90 g of solids).

After a kneading time of 1 hour, the PSA is applied from solution to a siliconized release paper and is dried in a drying oven first at 60° C. and after 10 minutes at 130° C.

The thickness of the PSA film is set at a) 0.06 mm and at b) 0.1 mm.

The bond strength of the PSA film is a) 0.8 N/cm and b) 1.1 N/cm.

The rolling ball tack figures are a) 33 mm and b) 28 mm.

The pH is in each case from 9.5 to 10.0.

The volume resistance in the z direction is a) 0.3 Ωm and b) 4.9 Ωm.

After a storage time of one year the figures are unchanged.

Example 11

The PSA of the adhesive tape of the invention has the following composition:
65% by weight solids of the known PSA 4
15% by weight Weißfeinkalk®
20% by weight CONDUKT-O-FIL S-3000-S3M®

For its preparation, 21 g of Weißfeinkalk® and 28 g of CONDUKT-O-FIL S-3000-S3M® are added to 300 g of the known PSA 4 present at a concentration of 30% in toluene (corresponding to 90 g of solids).

After a kneading time of 1 hour, the PSA is applied from solution to a siliconized release paper and is dried in a drying oven first at 60° C. and after 10 minutes at 130° C.

The thickness of the PSA film is set at a) 0.06 mm and at b) 0.1 mm.

The bond strength of the PSA film is a) 0.7 N/cm and b) 0.9 N/cm.

The rolling ball tack figures are a) 40 mm and b) 31 mm.

The pH is in each case from 9.5 to 10.0.

The volume resistance in the z direction is a) 1.9 Ωm and b) 33.2 Ωm.

After a storage time of one year the figures are unchanged.

Example 12

The PSA of the adhesive tape of the invention has the following composition:
  35% by weight solids of the known PSA 5
  5% by weight Weißfeinkalk®
  60% by weight ECKA copper CH-S 24®

For its preparation, 46.2 g of Weißfeinkalk® and, in portions, 554.4 g of ECKA copper CH-S 24® are added to 300 g of the A component of the known PSA 5.

After a mixing time of 2 hours in the dissolver under vacuum, 23.4 g of Vestanat IPDI® (B component) are admixed using a 2-component mixing and metering unit and the mixture is applied to a siliconized release paper.

The chemical reaction of the two mixed components to give the PSA takes place at 70° C. in a drying oven.

The thickness of the PSA film is set at a) 0.06 mm and at b) 0.1 mm.

The bond strength of the PSA film is a) 0.1 N/cm and b) 0.1 N/cm.

The rolling ball tack figures are a) 95 mm and b) 90 mm.

The pH is in each case from 8.5.

The volume resistance in the z direction is a) 0.06 Ωm and b) 0.09 Ωm.

After a storage time of one year the figures are unchanged.

Example 13

The PSA of the adhesive tape of the invention has the following composition:
  65% by weight solids of the known PSA 5
  15% by weight Weißfeinkalk®
  20% by weight ECKA copper CH-S 24®

For its preparation, 74.6 g of Weißfeinkalk® and 99.5 g of ECKA copper CH-S 24® are added to 300 g of the A component of the known PSA 5.

After a mixing time of 2 hours in the dissolver under vacuum, 23.4 g of Vestanat IPDI® (B component) are admixed using a 2-component mixing and metering unit and the mixture is applied to a siliconized release paper.

The chemical reaction of the two mixed components to give the PSA takes place at 70° C. in a drying oven.

The thickness of the PSA film is set at a) 0.06 mm and at b) 0.1 mm.

The bond strength of the PSA film is a) 1.4 N/cm and b) 1.8 N/cm.

The rolling ball tack figures are a) 16 mm and b) 9 mm.

The pH is in each case from 9.5 to 10.0.

The volume resistance in the z direction is a) 0.3 Ωm and b) 0.9 Ωm.

After a storage time of one year the figures are unchanged.

Example 14

The PSA of the adhesive tape of the invention has the following composition:
  55% by weight of the known PSA 5
  40% by weight Weißfeinkalk®
  5% by weight ECKA copper CH-S 24®

For its preparation, 235.2 g of Weißfeinkalk® and, in portions, 29.4 g of ECKA copper CH-S 24® are added to 300 g of the A component of the known PSA 5.

After a mixing time of 2 hours in the dissolver under vacuum, 23.4 g of Vestanat IPDI® (B component) are admixed using a 2-component mixing and metering unit and the mixture is applied to a siliconized release paper.

The chemical reaction of the two mixed components to give the PSA takes place at 70° C. in a drying oven.

The thickness of the PSA film is set at a) 0.06 mm and at b) 0.1 mm.

The bond strength of the PSA film is a) 0.1 N/cm and b) 0.2 N/cm.

The rolling ball tack figures are a) 88 mm and b) 69 mm.

The pH is in each case 12.0.

The volume resistance in the z direction is a) 160 Ωm and b) 420 Ωm.

After a storage time of one year the figures are unchanged.

Example 15

The PSA of the adhesive tape of the invention has the following composition:
  65% by weight of the known PSA 5
  15% by weight Weißfeinkalk®
  20% by weight ECKA copper CH-S No. 34862/G AG 5®

For its preparation, 74.6 g of Weißfeinkalk® and 99.5 g of ECKA copper CH-S No. 34862/G AG 5® are added to 300 g of the A component of the known PSA 5.

After a mixing time of 2 hours in the dissolver under vacuum, 23.4 g of Vestanat IPDI® (B component) are admixed using a 2-component mixing and metering unit and the mixture is applied to a siliconized release paper.

The chemical reaction of the two mixed components to give the PSA takes place at 70° C. in a drying oven.

The thickness of the PSA film is set at a) 0.06 mm and at b) 0.1 mm.

The bond strength of the PSA film is a) 1.3 N/cm and b) 1.7 N/cm.

The rolling ball tack figures are a) 17 mm and b) 9 mm.

The pH is in each case from 9.5 to 10.0.

The volume resistance in the z direction is a) 7.3 Ωm and b) 44.1 Ωm.

After a storage time of one year the figures are unchanged.

Examples 16 to 25

Table 3 lists the base materials used to prepare a polyurethane-based PSA film, in each case with their trade name and manufacturer. The chemicals named are all freely available commercially.

TABLE 3

Base materials used to prepare the polyurethane-based PSA film, with trade name and manufacturer

| Trade name | Chemical basis | Manufacturer/Supplier |
|---|---|---|
| Arcol 1004 ® | Polypropylene glycol, diol (M = 430) | Bayer |
| Arcol P 1000 N ® | Polypropylene glycol, diol (M = 1 000) | Bayer |
| Arcol 1067S ® | Polypropylene glycol, triol (M = 1 000) | Bayer |
| Baycoll BT 5031 ® | Polypropylene glycol, triol (M = 6 200) | Bayer |
| Mark DBTL ® | Dibutyltin dilaurate | Nordmann, Rassmann |
| Vestanat IPDI ® | Isophorone diisocyanate | Hüls |
| Aerosil R202 ® | Hydrophobicized pyrogenic silica | Degussa |

For the description of the polyurethane-based adhesive tape of the invention, in the following examples the alkaline fillers and metal powders as shown in tables 1 and 2 are used.

Example 16

The composition of the PSA of the polyurethane-based adhesive tape of the invention is as follows:

|  | Raw material | Weight fraction [% by weight] |
|---|---|---|
| A-component | Arcol 1004 ® | 2.0 |
|  | Baycoll BT 5031 ® | 27.4 |
|  | ECKA copper CH-S 24 ® | 60.0 |
|  | Weissfeinkalk ® | 5.0 |
|  | Aerosil R 202 ® | 3.0 |
|  | Mark DBTL ® | 0.2 |
| B-component | Vestanat IPDI ® | 2.4 |

The thickness of the PSA film is set at a) 0.06 mm and at b) 0.1 mm.

The bond strength of the PSA film is a) 0.1 N/cm and b) 0.1 N/cm.

The rolling ball tack figures are a) 95 mm and b) 90 mm.

The pH is in each case 8.5.

The volume resistance in the z direction is a) 0.06 $\Omega$m and b) 0.09 $\Omega$m.

After a storage time of one year the figures are unchanged.

Following repeated application of road earth to the PSA film and subsequent removal by rinsing with mains water, the figures are likewise unchanged.

Example 17

The composition of the PSA of the polyurethane-based adhesive tape of the invention is as follows:

|  | Raw material | Weight fraction [% by weight] |
|---|---|---|
| A-component | Arcol 1004 ® | 3.8 |
|  | Baycoll BT 5031 ® | 53.3 |
|  | ECKA copper CH-S 24 ® | 20.0 |
|  | Weissfeinkalk ® | 15.0 |
|  | Aerosil R 202 ® | 3.0 |
|  | Mark DBTL ® | 0.2 |
| B-component | Vestanat IPDI ® | 4.7 |

The thickness of the PSA film is set at a) 0.06 mm and at b) 0.1 mm.

The bond strength of the PSA film is a) 1.4 N/cm and b) 1.8 N/cm.

The rolling ball tack figures are a) 16 mm and b) 9 mm.

The pH is in each case from 9.5 to 10.

The volume resistance in the z direction is a) 0.3 $\Omega$m and b) 0.9 $\Omega$m.

After a storage time of one year the figures are unchanged.

Following repeated application of road earth to the PSA film and subsequent removal by rinsing with mains water, the figures are likewise unchanged.

Example 18

The composition of the PSA of the polyurethane-based adhesive tape of the invention is as follows:

|  | Raw material | Weight fraction [% by weight] |
|---|---|---|
| A-component | Arcol 1004 ® | 3.2 |
|  | Baycoll BT 5031 ® | 44.6 |
|  | ECKA copper CH-S 24 ® | 5.0 |
|  | Weissfeinkalk ® | 40.0 |
|  | Aerosil R 202 ® | 3.0 |
|  | Mark DBTL ® | 0.2 |
| B-component | Vestanat IPDI ® | 4.0 |

The thickness of the PSA film is set at a) 0.06 mm and at b) 0.1 mm.

The bond strength of the PSA film is a) 0.1 N/cm and b) 0.2 N/cm.

The rolling ball tack figures are a) 88 mm and b) 69 mm.

The pH is in each case 12.

The volume resistance in the z direction is a) 160 $\Omega$m and b) 420 $\Omega$m.

After a storage time of one year the figures are unchanged.

Following repeated application of road earth to the PSA film and subsequent removal by rinsing with mains water, the figures are likewise unchanged.

Example 19

The composition of the PSA of the polyurethane-based adhesive tape of the invention is as follows:

|  | Raw material | Weight fraction [% by weight] |
|---|---|---|
| A-component | Arcol 1004 ® | 3.8 |
|  | Baycoll BT 5031 ® | 53.3 |
|  | ECKA copper CH-S No. 34862/G AG 5 ® | 20.0 |
|  | Weissfeinkalk ® | 15.0 |
|  | Aerosil R 202 ® | 3.0 |
|  | Mark DBTL ® | 0.2 |
| B-component | Vestanat IPDI ® | 4.7 |

The thickness of the PSA film is set at a) 0.06 mm and at b) 0.1 mm.

The bond strength of the PSA film is a) 1.3 N/cm and b) 1.7 N/cm.

The rolling ball tack figures are a) 17 mm and b) 9 mm.

The pH is in each case from 9.5 to 10.

The volume resistance in the z direction is a) 7.3 $\Omega$m and b) 44.1 $\Omega$m.

After a storage time of one year the figures are unchanged.

Following repeated application of road earth to the PSA film and subsequent removal by rinsing with mains water, the figures are likewise unchanged.

Example 20

The composition of the PSA of the polyurethane-based adhesive tape of the invention is as follows:

|  | Raw material | Weight fraction [% by weight] |
|---|---|---|
| A-component | Arcol 1004 ® | 3.8 |
|  | Baycoll BT 5031 ® | 53.3 |

-continued

|  | Raw material | Weight fraction [% by weight] |
|---|---|---|
|  | CONDUKT-O-FIL S-3000-S3M ® | 20.0 |
|  | Weissfeinkalk ® | 15.0 |
|  | Aerosil R 202 ® | 3.0 |
|  | Mark DBTL ® | 0.2 |
| B-component | Vestanat IPDI ® | 4.7 |

The thickness of the PSA film is set at a) 0.06 mm and at b) 0.1 mm.

The bond strength of the PSA film is a) 0.8 N/cm and b) 0.9 N/cm.

The rolling ball tack figures are a) 33 mm and b) 47 mm.

The pH is in each case from 9.5 to 10.

The volume resistance in the z direction is a) 17 Ωm and b) 133 Ωm.

After a storage time of one year the figures are unchanged.

Following repeated application of road earth to the PSA film and subsequent removal by rinsing with mains water, the figures are likewise unchanged.

Example 21

The composition of the PSA of the polyurethane-based adhesive tape of the invention is as follows:

|  | Raw material | Weight fraction [% by weight] |
|---|---|---|
| A-component | Arcol 1004 ® | 3.8 |
|  | Baycoll BT 5031 ® | 53.3 |
|  | STANDART Aluminum Powder Lack NOT ® | 20.0 |
|  | Weissfeinkalk ® | 15.0 |
|  | Aerosil R 202 ® | 3.0 |
|  | Mark DBTL ® | 0.2 |
| B-component | Vestanat IPDI ® | 4.7 |

The thickness of the PSA film is set at a) 0.06 mm and at b) 0.1 mm.

The bond strength of the PSA film is a) 0.6 N/cm and b) 0.8 N/cm.

The rolling ball tack figures are a) 64 mm and b) 68 mm.

The pH is in each case from 9.0 to 9.5.

The volume resistance in the z direction is a) 23 Ωm and b) 130 Ωm.

After a storage time of one year the figures are unchanged.

Following repeated application of road earth to the PSA film and subsequent removal by rinsing with mains water, the figures are likewise unchanged.

Example 22

The composition of the PSA of the polyurethane-based adhesive tape of the invention is as follows:

|  | Raw material | Weight fraction [% by weight] |
|---|---|---|
| A-component | Arcol P 1000 N ® | 34.5 |
|  | Arcol 1067 S ® | 15.4 |
|  | ECKA copper CH-S 24 ® | 20.0 |
|  | Weissfeinkalk ® | 15.0 |

|  | Raw material | Weight fraction [% by weight] |
|---|---|---|
|  | Aerosil R 202 ® | 3.0 |
|  | Mark DBTL ® | 0.2 |
| B-component | Vestanat IPDI ® | 11.9 |

The thickness of the PSA film is set at a) 0.06 mm and at b) 0.1 mm.

The bond strength of the PSA film is a) 2.4 N/cm and b) 2.7 N/cm.

The rolling ball tack figures are a) 12 mm and b) 9 mm.

The pH is in each case from 9.0 to 9.5.

The volume resistance in the z direction is a) 0.8 Ωm and b) 1.8 Ωm.

After a storage time of one year the figures are unchanged.

Following repeated application of road earth to the PSA film and subsequent removal by rinsing with mains water, the figures are likewise unchanged.

Example 23

The composition of the PSA of the polyurethane-based adhesive tape of the invention is as follows:

|  | Raw material | Weight fraction [% by weight] |
|---|---|---|
| A-component | Arcol P 1000 N ® | 34.5 |
|  | Arcol 1067 S ® | 15.4 |
|  | ECKA copper CH-S 24 ® | 20.0 |
|  | Sodium carbonate powder | 15.0 |
|  | Aerosil R 202 ® | 3.0 |
|  | Mark DBTL ® | 0.2 |
| B-component | Vestanat IPDI ® | 11.9 |

The thickness of the PSA film is set at a) 0.06 mm and at b) 0.1 mm.

The bond strength of the PSA film is a) 1.9 N/cm and b) 2.3 N/cm.

The rolling ball tack figures are a) 12 mm and b) 9 mm.

The pH is in each case from 8.5 to 9.0.

The volume resistance in the z direction is a) 0.9 Ωm and b) 1.8 Ωm.

After a storage time of one year the figures are unchanged.

Following repeated application of road earth to the PSA film and subsequent removal by rinsing with mains water, the figures are likewise unchanged.

Example 24

The composition of the PSA of the polyurethane-based adhesive tape of the invention is as follows:

|  | Raw material | Weight fraction [% by weight] |
|---|---|---|
| A-component | Arcol P 1000 N ® | 34.5 |
|  | Arcol 1067 S ® | 15.4 |
|  | ECKA copper CH-S 24 ® | 20.0 |
|  | Potassium carbonate powder | 15.0 |
|  | Aerosil R 202 ® | 3.0 |

-continued

|  | Raw material | Weight fraction [% by weight] |
|---|---|---|
|  | Mark DBTL ® | 0.2 |
| B-component | Vestanat IPDI ® | 11.9 |

The thickness of the PSA film is set at a) 0.06 mm and at b) 0.1 mm.

The bond strength of the PSA film is a) 2.1 N/cm and b) 2.4 N/cm.

The rolling ball tack figures are a) 14 mm and b) 12 mm.

The pH is in each case from 9.0 to 9.5.

The volume resistance in the z direction is a) 1.3 Ωm and b) 12.4 Ωm.

After a storage time of one year the figures are unchanged.

Following repeated application of road earth to the PSA film and subsequent removal by rinsing with mains water, the figures are likewise unchanged.

Example 25

The composition of the PSA of the polyurethane-based adhesive tape of the invention is as follows:

|  | Raw material | Weight fraction [% by weight] |
|---|---|---|
| A-component | Arcol P 1000 N ® | 34.5 |
|  | Arcol 1067 S ® | 15.4 |
|  | ECKA copper CH-S 24 ® | 20.0 |
|  | Sodium carbonate/potassium carbonate powder (1:1) | 15.0 |
|  | Aerosil R 202 ® | 3.0 |
|  | Mark DBTL ® | 0.2 |
| B-component | Vestanat IPDI ® | 11.9 |

The thickness of the PSA film is set at a) 0.06 mm and at b) 0.1 mm.

The bond strength of the PSA film is a) 2.0 N/cm and b) 2.3 N/cm.

The rolling ball tack figures are a) 12 mm and b) 11 mm.

The pH is in each case from 9.0 to 9.5.

The volume resistance in the z direction is a) 0.8 Ωm and b) 14.6 Ωm.

After a storage time of one year the figures are unchanged.

Following repeated application of road earth to the PSA film and subsequent removal by rinsing with mains water, the figures are likewise unchanged.

Comparative Examples

Comparative Example 1

In analogy to example 13, 15% by weight of sodium carbonate granules are used instead of 15% by weight of Weißfeinkalk®.

A highly granular, inhomogeneous adhesive tape is obtained whose surface possesses sharply delimited alkaline and nonalkaline regions in accordance with the particle distribution of the sodium carbonate. The alkalinity is not homogeneous.

Comparative Example 2

In analogy to example 15, the thickness of the PSA film is set at 0.5 mm.

The adhesive tape is not electrically conductive. The volume resistance in the z direction is $1.3 \times 10^8$ Ωm.

Comparative Example 3

In analogy to example 23, 15% by weight of sodium carbonate granules are used instead of 15% by weight of sodium carbonate powder.

A highly granular, inhomogeneous adhesive tape is obtained whose surface possesses sharply delimited alkaline and nonalkaline regions in accordance with the particle distribution of the sodium carbonate. The alkalinity is not homogeneous.

Comparative Example 4

In analogy to example 19, the thickness of the PSA film is set at 0.5 mm.

The adhesive tape is not electrically conductive. The volume resistance in the z direction is $1.3 \times 10^8$ Ωm.

What is claimed is:

1. An adhesive tape with permanent full-area pressure sensitive adhesiveness, comprising a pressure sensitive adhesive film coated onto an antiadhesive medium, said pressure sensitive adhesive film comprises:
    a) an alkaline, solid, pulverized, mineral filler with a weight fraction of between more than 0% by weight and 60% by weight, based on the total weight of the adhesive, a surface of the adhesive tape has having a pH of more than 8, and
    b) at least one conductive additive, with a weight fraction of between more than 0% by weight and 60% by weight based on the total weight of the adhesive, the adhesive tape being electrically conductive in a z direction, said z direction being the thickness of the tape, wherein a particle diameter of the conductive additive, based on at least 80% of the particles of the conductive additive, is at least 30% of the thickness of the pressure sensitive adhesive film.

2. The tape as claimed in claim 1, wherein the particle diameter of the mineral filler, based on at least 80% of said particles, is not more than 0.5 mm.

3. The tape as claimed in claim 2, wherein the particle diameter of the mineral filler is not more than 0.1 mm.

4. The tape as claimed in claim 1, wherein the weight fraction of the mineral filler is from 5% by weight to 40% by weight based on the total weight of the adhesive.

5. The tape as claimed in claim 4, wherein the weight fraction of the mineral filler is from 5% by weight to 30% by weight based on the total weight of the adhesive.

6. The tape as claimed in claim 4, wherein the weight fraction of the mineral filler is from 5% by weight to 20% by weight based on the total weight of the adhesive.

7. The tape as claimed in claim 1, wherein the weight fraction of the conductive additive is from 10% by weight to 30% by weight, based on the total weight of the adhesive.

8. The tape as claimed in claim 1, wherein the bond strength of the pressure sensitive adhesive film is at least 0.1 N/cm.

9. The tape as claimed in claim 8, wherein the bond strength of the pressure sensitive adhesive film is at least 0.01 N/cm.

10. The tape as claimed in claim 8, wherein the pressure sensitive adhesive film is a polyurethane-based pressure sensitive adhesive film.

11. The tape as claimed in claim 1, wherein the pressure sensitive adhesive film has a tackiness reflected by a measurement of least 100 mm or less achieved in a rolling ball tack test.

12. The tape as claimed in claim 11, wherein the measurement is at least 300 mm or less.

13. The tape as claimed in claim 11, wherein the pressure sensitive adhesive film is a polyurethane-based pressure sensitive adhesive film.

14. The tape as claimed in claim 1, wherein the pH of the surface of the pressure sensitive adhesive is at least 8.5.

15. The tape as claimed in claim 14, wherein the pressure sensitive adhesive is moistened.

16. The tape as claimed in claim 1, wherein the volume resistance of the pressure sensitive adhesive film in the z direction is not more than 500 $\Omega$m.

17. The tape as claimed in claim 16, wherein the volume resistance of the pressure sensitive adhesive film in the z direction is not more than 1000 $\Omega$m.

18. The tape as claimed in claim 16, wherein the pressure sensitive adhesive film is a polyurethane-based pressure sensitive adhesive film.

19. The tape as claimed in claim 1, which is unbacked.

20. The tape as claimed in claim 1, wherein the at least one conductive additive is selected from the group consisting of a metal powder, a powder coated with a metal, and metallized beads.

21. The tape as claimed in claim 1, wherein the particle diameter of the conductive additive is at least 70% of the thickness of said film.

22. A method of ensuring electrical functionality of electrostatic filters and an alkaline surface which has permanent inherent adhesiveness or pressure-sensitive adhesiveness, said method comprising attaching an adhesive tape as claimed in claim 1 to electrodes of the electrostatic filters.

23. An adhesive tape with permanent full-area pressure sensitive adhesiveness, comprising a pressure sensitive adhesive film coated onto an antiadhesive medium, said pressure sensitive adhesive film comprises:

a) an alkaline, solid, pulverized, mineral filler having a pH greater than 8 when wet with a weight fraction of between 5% by weight and 40% by weight, based on the total weight of the adhesive, a surface of the adhesive tape having a pH of more than 8, and b) at least one conductive additive, with a weight fraction of between 10% by weight and 30% by weight based on the total weight of the adhesive, the adhesive tape being electrically conductive in a z direction, said z direction being the thickness of the tape, wherein a particle diameter of the conductive additive, based on at least 80% of the particles of the conductive additive, is at least 30% of the thickness of the pressure sensitive adhesive film.

* * * * *